Oct. 25, 1960 M. DI GIOVANNI 2,958,056
TRANSDUCER
Filed Dec. 10, 1956 10 Sheets-Sheet 1
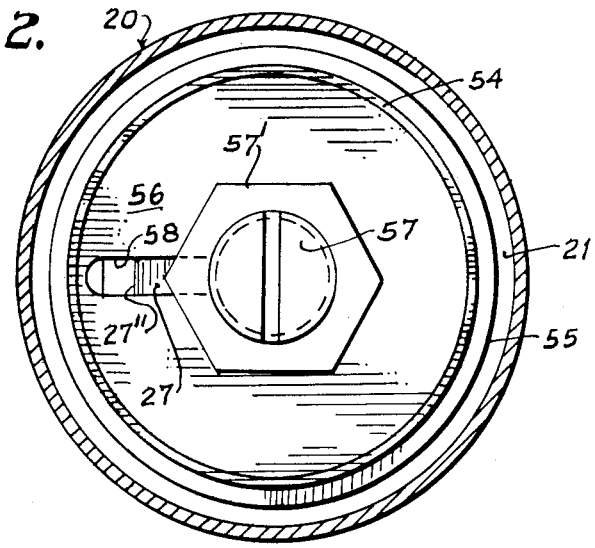
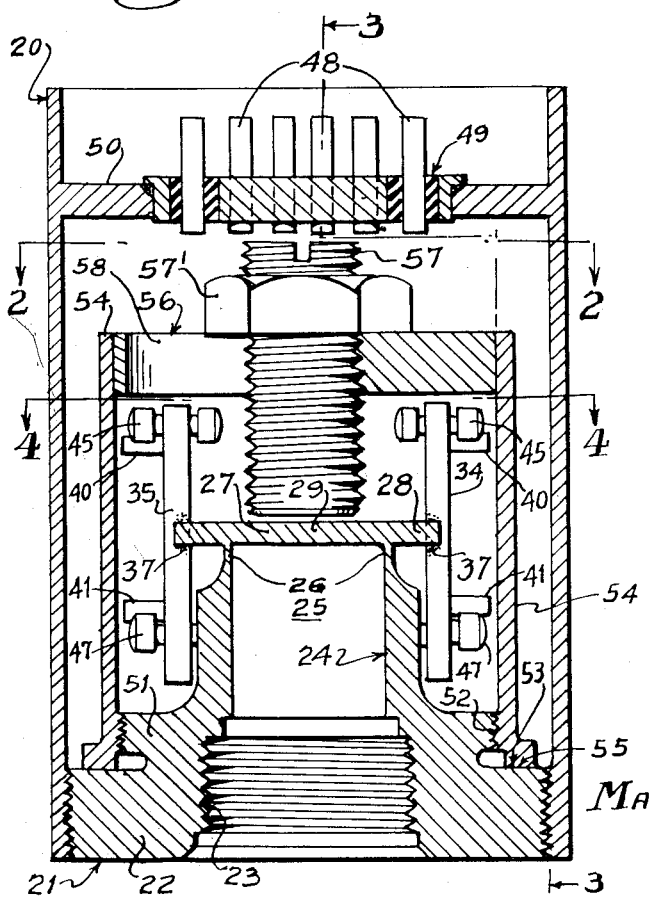
INVENTOR
MARIO DI GIOVANNI
BY Philip Sutker
ATTORNEY.

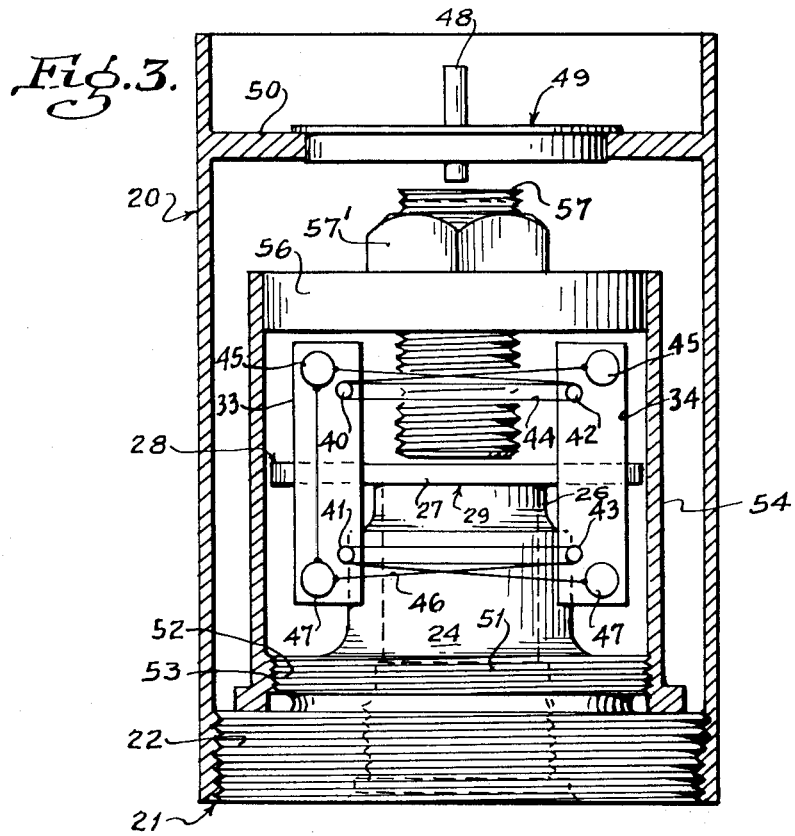
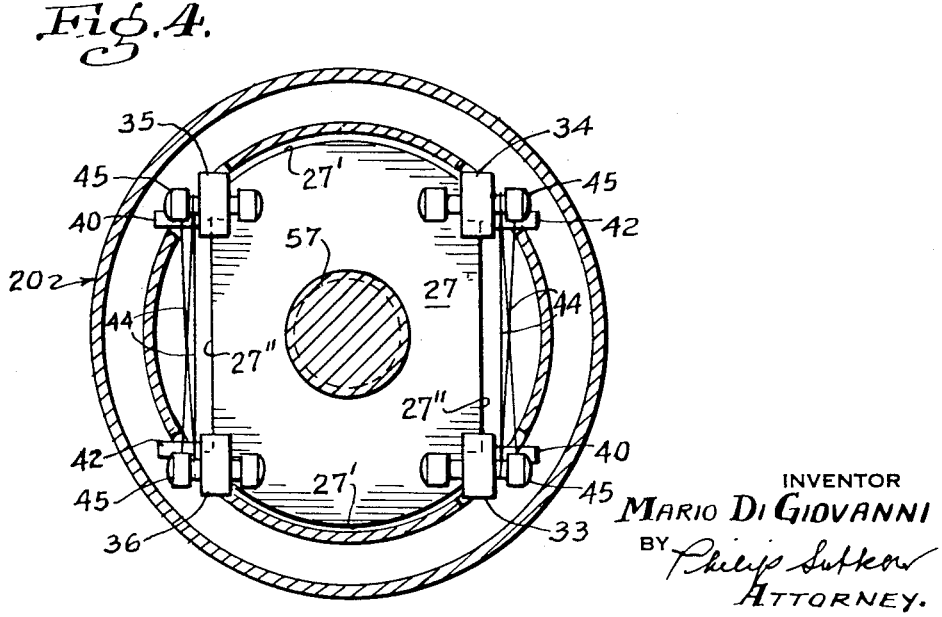

Oct. 25, 1960  M. DI GIOVANNI  2,958,056
TRANSDUCER

Filed Dec. 10, 1956  10 Sheets-Sheet 3

INVENTOR
MARIO DI GIOVANNI
BY Philip Sutton
ATTORNEY.

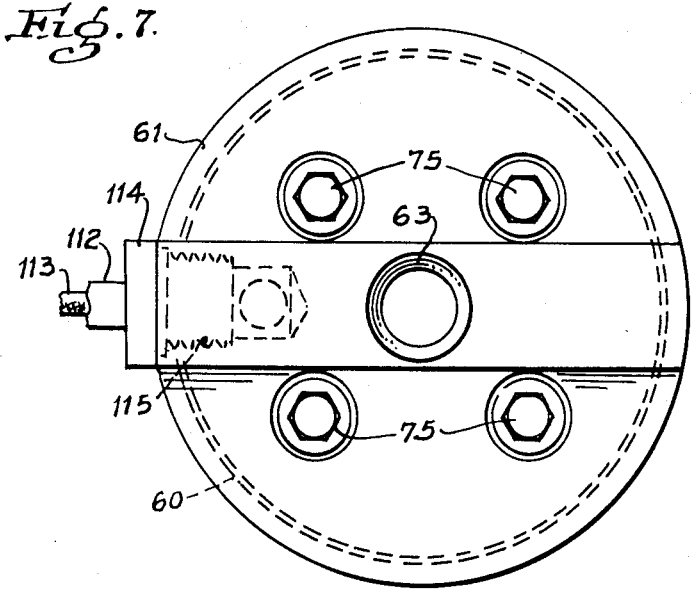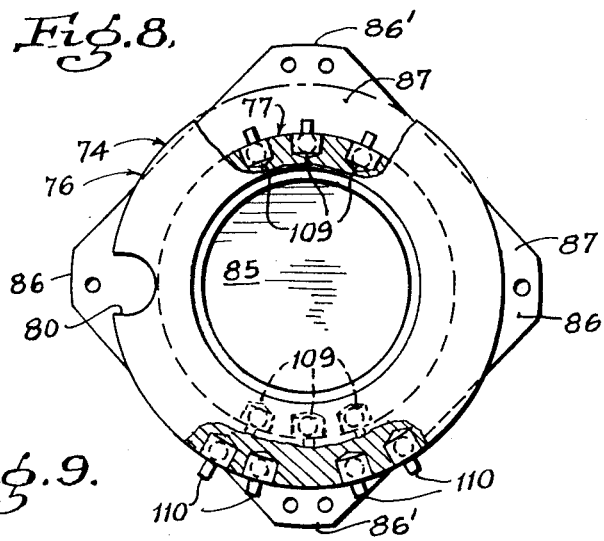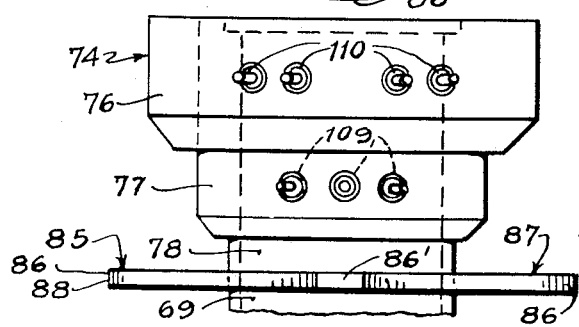

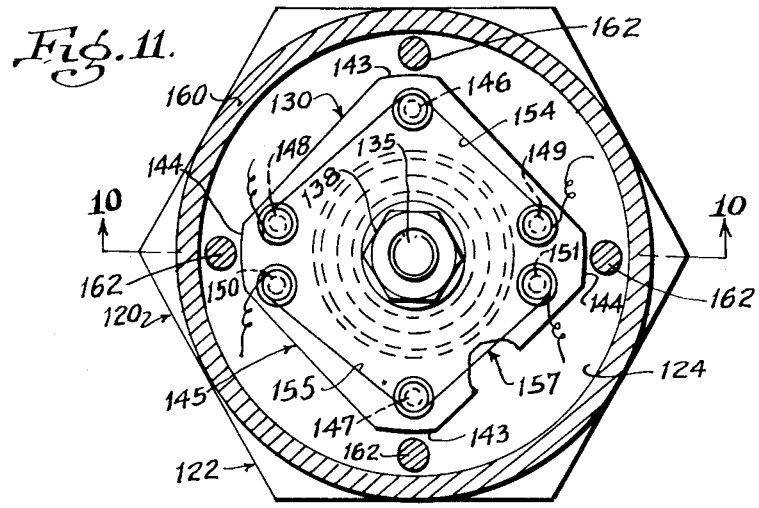
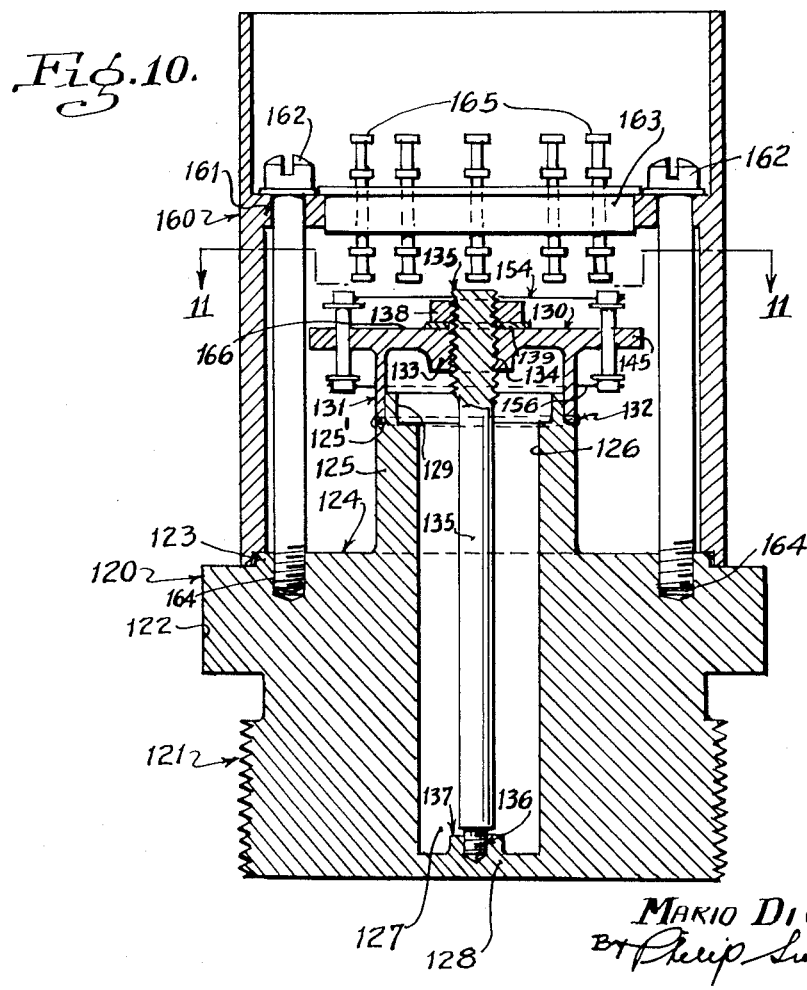

Oct. 25, 1960

M. DI GIOVANNI 2,958,056

TRANSDUCER

Filed Dec. 10, 1956

INVENTOR
MARIO DI GIOVANNI
BY Philip Sutton
ATTORNEY.

Oct. 25, 1960     M. DI GIOVANNI     2,958,056
TRANSDUCER
Filed Dec. 10, 1956     10 Sheets-Sheet 7
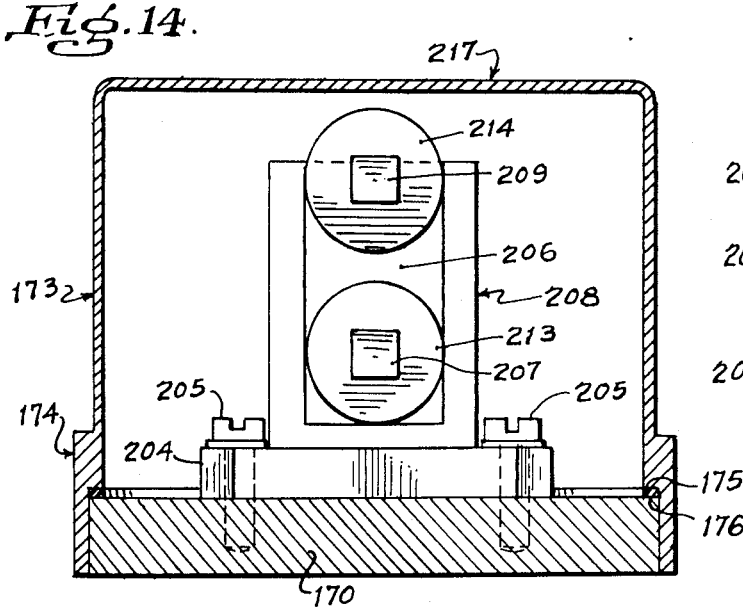
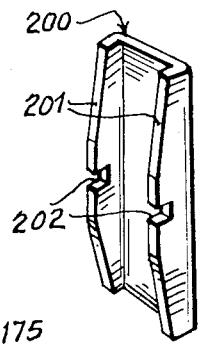
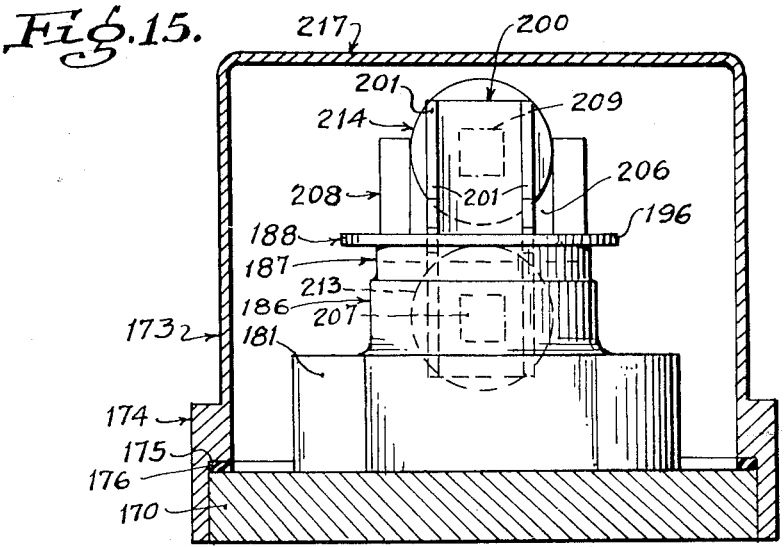
INVENTOR
MARIO DI GIOVANNI
BY Philip Sutkow
ATTORNEY.

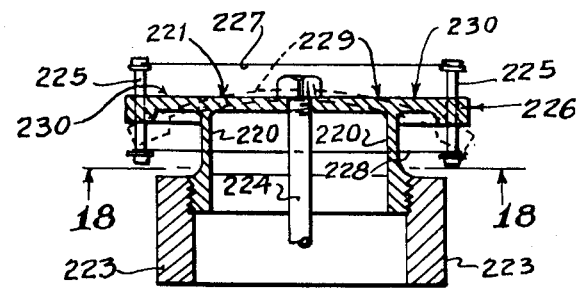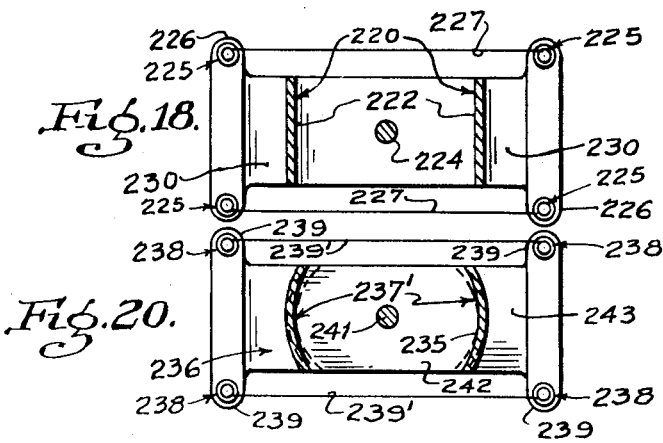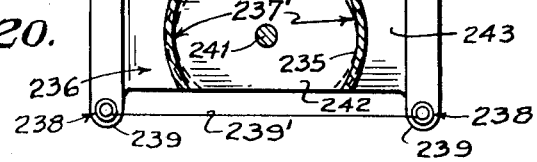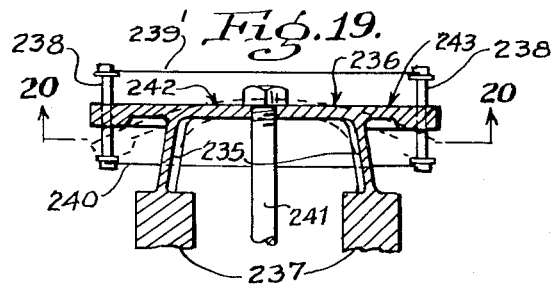
INVENTOR
MARIO DI GIOVANNI
BY
ATTORNEY.

Oct. 25, 1960 M. DI GIOVANNI 2,958,056
TRANSDUCER
Filed Dec. 10, 1956 10 Sheets-Sheet 9

INVENTOR.
MARIO DI GIOVANNI
BY Philip Subkow
ATTORNEY

Oct. 25, 1960
M. DI GIOVANNI
2,958,056
TRANSDUCER
Filed Dec. 10, 1956
10 Sheets-Sheet 10
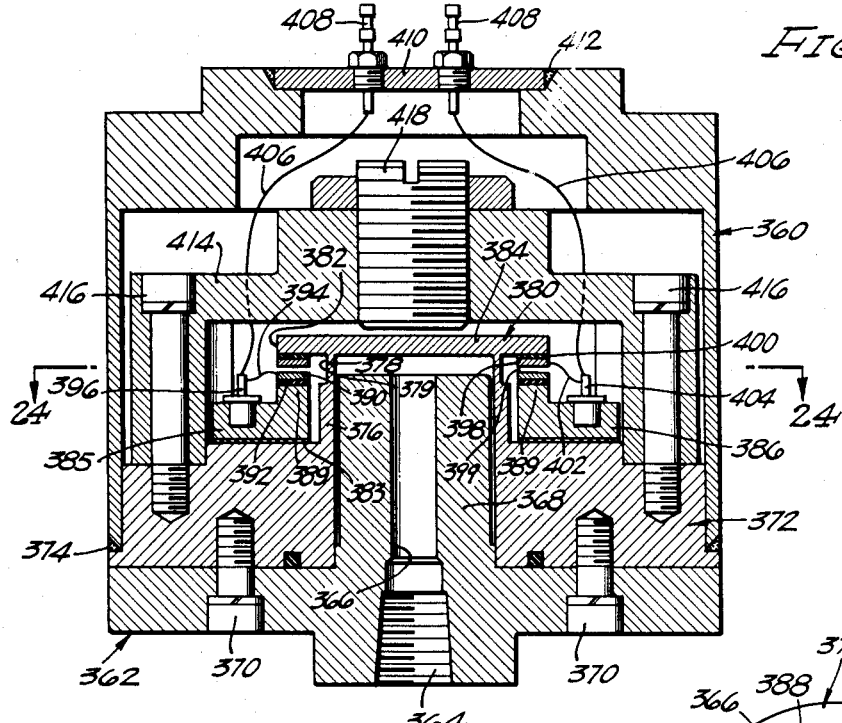
FIG. 23.
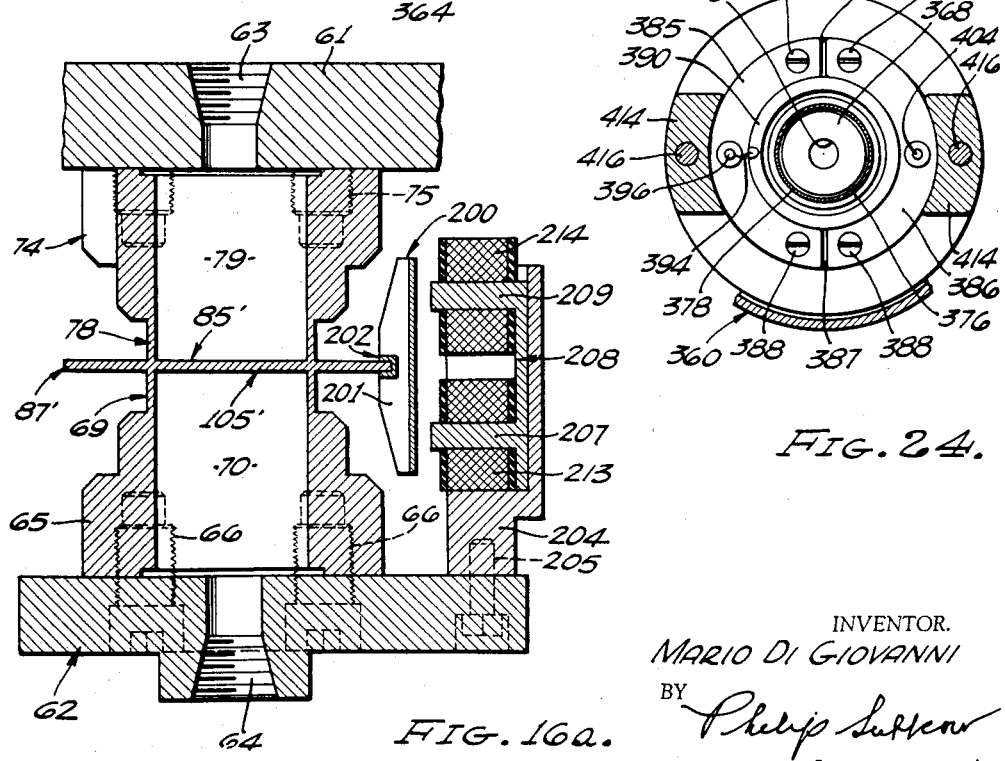
FIG. 16a.
FIG. 24.
INVENTOR.
MARIO DI GIOVANNI
BY
Philip Suffern
ATTORNEY

# United States Patent Office 2,958,056
Patented Oct. 25, 1960

2,958,056

TRANSDUCER

Mario Di Giovanni, Pacific Palisades, Calif., assignor to Statham Instruments, Inc., a corporation of California Filed Dec. 10, 1956, Ser. No. 627,375

34 Claims. (Cl. 336—30)

This invention relates to a transducer or a motion sensing device, and more particularly concerns instruments for measuring forces, movements, fluid pressures, and the like. Such transducer may be of various forms and incorporating, for example, an unbonded strain gauge, or an inductive or capacitance means as the motion sensing mechanism.

This application is a continuation-in-part of my copending applications Serial Nos. 515,111, 515,112 and 515,196, all filed June 13, 1955. Serial No. 515,111 is now Patent No. 2,840,675, and Serial Numbers 515,112 and 515,196 have been abandoned.

Unbonded strain gauges are generally composed essentially of a strain sensitive wire connected to two supports which are subject to separation under an applied force. When subjected to tension the wire changes in dimensions, and therefore changes in resistance. Means are provided for measuring the resulting change in resistance which is then translatable into a measurement of the applied force. Such gauges have found a wide application in industry.

Usually, the movable members employed in such devices have supports or linkages to which the mountings for the strain wires are attached. Hence, the strain wire does not change in tension directly in response to movement of such movable members, which are generally in the form of diaphragms to which the force to be measured is applied, but rather in response to movement of such intermediary supports and linkages to which the wire mountings are connected. Hence, the change in tension of the strain wire in such instruments is brought about only indirectly in response to movement of the primary movable members or diaphragms. The use of the intermediate linkages and supports in the prior art devices renders such devices relatively complicated in structure, increases their weight and size, and tends toward inaccuracy of response.

Accordingly, one object of this invention is the elimination of the intermediate linkages and supports connected between the primary movable member of the transducer and the motion sensing means, e.g., strain wire associated therewith.

Another object is the attachment of the motion sensing means, e.g., the strain wire supporting pins and the strain wire connected thereto, directly to the primary movable member or diaphragm without the interposition of intermediate supports or linkages.

A still further object is the provision of a transducer capable of responding to a rectilinear motion, and employing the mechanical advantage obtained from a bell crank type of arrangement so as to increase the sensitivity and power output of the transducer or gauge.

A still further object is to provide a transducer or pressure gauge whose sensitivity to acceleration forces when employed in a moving vehicle, such as an airplane, is substantially reduced.

Still another object is the provision of a transducer of relatively small dimensions and having a minimum of structural elements, and which is readily assembled, is relatively inexpensive, yet which is reliable in operation.

I have now devised a transducer basically comprising a flexible beam supported intermediate its ends on a flexible support or flexure, and a motion sensing means associated with said beam, preferably the outer end of the beam beyond said flexible support. The transducer, e.g., in the form of a pressure gauge, dynamometer or accelerometer, comprises a frame, and the flexible support or flexure member is connected to said flexible beam and to said frame at spaced points intermediate the ends of said beam and at an angle thereto, to provide spaced and localized points of bending in said flexure member intermediate the ends of said beam. Means, e.g., in the form of a pressure means including a pressure chamber, or rod, is provided for applying a force to said beam to produce a deflection of said beam on said flexure member at points between the flexure member in a direction opposite to the direction of deflection of said beam at points beyond said flexure member. An element of the motion sensing means, according to certain embodiments of the invention, may be mechanically connected directly to said beam near the outer end thereof, said element extending outwardly from said beam, preferably in a direction normal thereto. According to certain other embodiments, the outer end of the beam is not mechanically connected to the motion sensing means.

A force, e.g., a pressure, applied to said beam either on the same or the other side of the flexure member or flexible support from its connection to said beam, i.e., applied to the outer end of said beam or adjacent the center of the beam, produces a flexure of said beam and said flexible support, in turn causing movement of the end of said beam beyond said flexible support in a direction opposite to the direction of movement of the central portion of said beam. The result is a pivotal motion of said element of the motion sensing means which is associated with the outer end of the beam, to produce a response of said motion sensing means corresponding to the motion of the beam and the magnitude of the force applied thereto.

Stated in a somewhat different manner, the invention comprises a flexible beam, a frame, a flexure having a plurality of spaced areas of bending connected at spaced points to the flexible beam intermediate its ends and to the frame, the beam having an area of bending between the spaced points of connection to the flexure, and extending in opposite directions beyond the flexure to provide two opposite cantilever ends. A force summing means is connected to the beam to deflect said beam, the beam between said points of connection deflecting in a direction opposite to the direction of deflection of the cantilever ends, and a motion sensing means, as noted above, is associated with said beam, preferably with the cantilever ends of the beam.

The flexure or flexible support for said beam may be two separate flexures unconnected except at the flexible beam and at the frame, or the flexure may be a single member, as in the case of a circular flexure described more fully hereinafter.

The flexible beam may be in a variety of shapes, which are intended to include not only a relatively narrow elongated member, but may be in the nature of a diaphragm of circular or elliptical shape, or of a shape having rounded corners and straight sides, or of any other suitable shape. The flexible support is connected to the flexible beam at two positions intermediate its ends, and if the support is in the nature of a pair of straight flexible walls parallel to each other, the connection between said flexible walls and the beam or diaphragm will be along two parallel lines in the plane of the beam so that flexure of the beam permitted by said flexible walls will be substantially in a longitudinal direction along the beam. On the other hand, if said flexible support or supports are arcuately shaped so that the connections between said supports and the beam or diaphragm are along arcs in the plane of said beam, said beam or diaphragm will deflect radially of said arcuate lines of connection on the application of a force against said diaphragm, and form a spherically shaped cap. In any event, the portions of said beam or diaphragm adjacent the periphery thereof and beyond the connections of said flexible supports with said beam will deflect from said connections in a direction opposite to deflection of the central portion of the diaphragm to form said cap.

According to a preferred embodiment, the flexible beam or diaphragm is designed with respect to mass and stiffness characteristics so that when the instrument is accelerated in a direction transverse to said flexible beam or diaphragm, the tendency of responsive movement in one direction of the inner portion of the beam between the flexure or flexures will be cancelled out by the tendency toward responsive movement in the opposite direction of the outer portion of the beam or diaphragm beyond the flexure or flexures. The mass and stiffness of the central portion of the beam or diaphragm within the flexure or flexures are accordingly made respectively equal to the mass and stiffness of the outer portion of the beam or diaphragm beyond the flexure or flexures, to thus render the instrument substantially insensitive to such acceleration.

As applied to a resistance wire strain gauge, the flexible beam, preferably in the form of a diaphragm, is mounted near its periphery on a flexible cylindrical support in a frame. On the application of uniformly distributed forces to the diaphragm, which forces may be applied to the inner portion of the diaphragm within the points of support thereof, the diaphragm deflects from an approximately flat configuration into a shape approximating that of a spherical cap. To an outer extension of the diaphragm beyond the points of support thereof in the frame may be fixed a plurality of lugs or insulated pins extending normal to the plane of the diaphragm. An array of electrical strain sensitive wires is looped between the lugs or pins on one or both sides of the diaphragm. The wires are thus disposed in a plane or planes parallel to the plane of the diaphragm and spaced therefrom, and said wires are connected electrically into a Wheatstone bridge circuit.

Where the strain wires are disposed on both sides of the diaphragm, when the diaphragm deflects under the applied forces, the strain wires on one side of the diaphragm are tensed and the wires on the other side of the diaphragm are relaxed, causing their relative resistance to change, and resulting in a change in the electrical balance of the bridge circuit. It is thus seen that the basic measuring system is the diaphragm and insulated array of strain wires supported directly by the diaphragm through the intermediary of the supporting pins or lugs, and the basic motion is a rotation of the lugs or pins in response to deflection of the diaphragm. In this manner a bell crank or lever arrangement is provided including the diaphragm and tilting lugs or pins as the arms of the bell crank. Thus, a small force applied against the diaphragm is multiplied because of the mechanical advantage to give a relatively larger tension on the wires. The angular displacement of the pins or lugs can thus be used to advantage to produce any desired magnification of the wire strain by making the pins or lugs of a suitable length to bring the plane of the resistance wires closer to or farther from the plane of the diaphragm.

The above device presents the following advantages over a typical bonded strain gauge applied, as is customary, on both sides of the diaphragm: (1) the strain wire device or motion sensing means is capable of being completely isolated from the area acted upon by the forces, and when used as a pressure gauge, this structure adds to simplification of construction, enabling the device to be readily adaptable to use with corrosive fluids, eliminating the necessity for pressure seals at holes for electrical leads; (2) the device is self temperature compensating; and (3) the wire loops can be strung under any desired initial tension and may be located at any desired distance from the plane of the diaphragm, making possible a substantially greater measure of control over the physical characteristics of the instrument.

When employed as a pressure transducer, there is provided a diaphragm-ended cylindrical pressure chamber flexibly supporting at its end a diaphragm. The diaphragm extends beyond the periphery of the cylinder, and onto the outer edge of the diaphragm exteriorly of the pressure chamber are mounted insulated lugs or pins between which are strung loops of strain wire. An internal pressure within the chamber actuates the diaphragm, as described above, to produce an electrical output.

Employing the invention transducer as a dynamometer, the diaphragm and strain wire structure described above is supported at the upper end of a chamber having a flexible end wall, and is provided with an actuating rod connected at one end to the center of the diaphragm, and at its opposite end to a flexible actuating member. The rod extends through a chamber in the instrument along the central axis of the diaphragm. A force applied to the actuating member produces axial movement of the actuating rod. Such axial movement produces deflection of the diaphragm and an electrical output through change in tension of the strain wires.

The transducer hereof can also be employed as a differential pressure transducer by providing the device with two pressure chambers, each one communicating with the opposite side of the sensing diaphragm. By connecting the strain wires on opposite sides of the diaphragm to give automatic indication of the ratio of the pressures in the two pressure chambers, a means of comparing pressures from two separate sources is provided.

Instead of employing a strain wire and pin device for sensing the motion of the diaphragm, capacitance, or inductive or electromagnetic motion sensing means can be employed. In one embodiment employing an inductive motion sensing means, an arm is connected to the outer periphery of the diaphragm, extending preferably normal thereto. Disposed opposite said arm and spaced therefrom are magnetic coils mounted in a core member. Pivotal motion of the arm as a result of the flexing of the diaphragm on application of a force or pressure thereagainst, causes one portion of the arm to approach one of said coils, and another portion of said arm to move away from said other coil. The relative increase or decrease in the air gaps between the arm and the respective coils, as a result of pivotal motion of said arm, changes the reluctance of the respective air gaps and the inductance of the coils, and such change can be measured by any suitable means.

According to a preferred embodiment employing an inductive motion sensing means, the outer end of the flexible beam or diaphragm itself functions as the armature, and oscillates between opposite pole pieces of an electromagnet on flexing of the beam or diaphragm, to thus vary the size of the air gaps between the end of the beam or diaphragm, and the respective pole pieces.

In still another embodiment employing a capacitance type motion sensing means, the outer end of the flexible beam or diaphragm carries one plate of a condenser, the other plate of the condenser being mounted on a stationary support and being spaced from the first plate. Motion of the outer end of the beam or diaphragm varies the length of the space between the condenser plates to vary the capacitance thereof and the electrical output of a circuit including said condenser.

My invention will be more readily understood from the description below taken in connection with the accompanying drawings, wherein:

Fig. 1 is an elevational section of one embodiment of the invention transducer employed as a pressure gauge;

Fig. 2 is a section taken on line 2—2 of Fig. 1;

Fig. 3 is a section taken on line 3—3 of Fig. 1;

Fig. 4 is a horizontal section taken on line 4—4 of Fig. 1;

Fig. 7 is a plan view of the device of Fig. 5;

Fig. 8 is a plan view of the device of Fig. 5 with the top member and certain other parts removed, and shown partly in section for clarity;

Fig. 9 is a side elevation of a portion of the device of Fig. 5;

Fig. 10 is an elevation in section of another embodiment of the invention transducer taken on line 10—10 of Fig. 11;

Fig. 11 is a section taken on line 11—11 of Fig. 10;

Fig. 14 is a view taken on line 14—14 of Fig. 12;

Fig. 15 is a view taken on line 15—15 of Fig. 12;

Fig. 16 is a perspective view of a detail of the device of Fig. 12;

Fig. 16a is a modification of the device of Fig. 5, employing an inductive type motion sensing means;

Fig. 17 is a schematic illustration of another embodiment of the invention;

Fig. 18 is a plan view of the embodiment of Fig. 17;

Fig. 19 is a schematic illustration of another embodiment of the invention;

Fig. 20 is a view taken on line 20—20 of Fig. 19;

Fig. 23 is a sectional elevation of still another embodiment of the invention utilizing a capacitance type motion sensing means; and Fig. 24 is a section taken on line 24—24 of Fig. 23.

Figure 6:
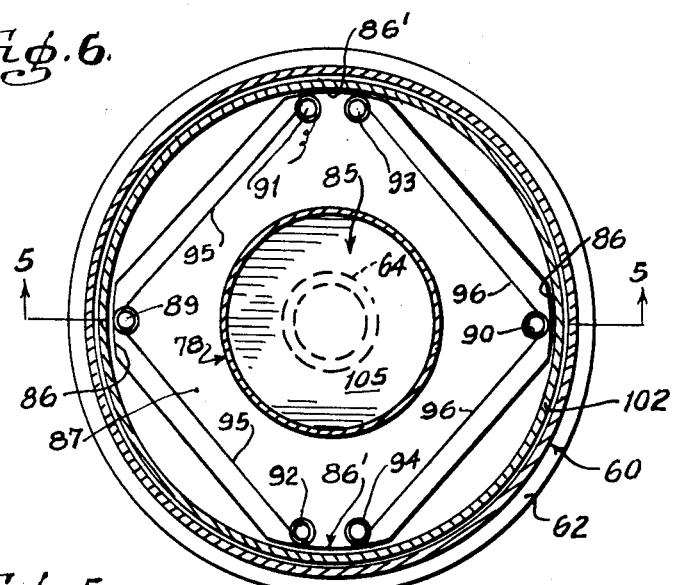
Fig. 6 is a horizontal section taken on line 6—6 of Fig. 5.
Figure 5:
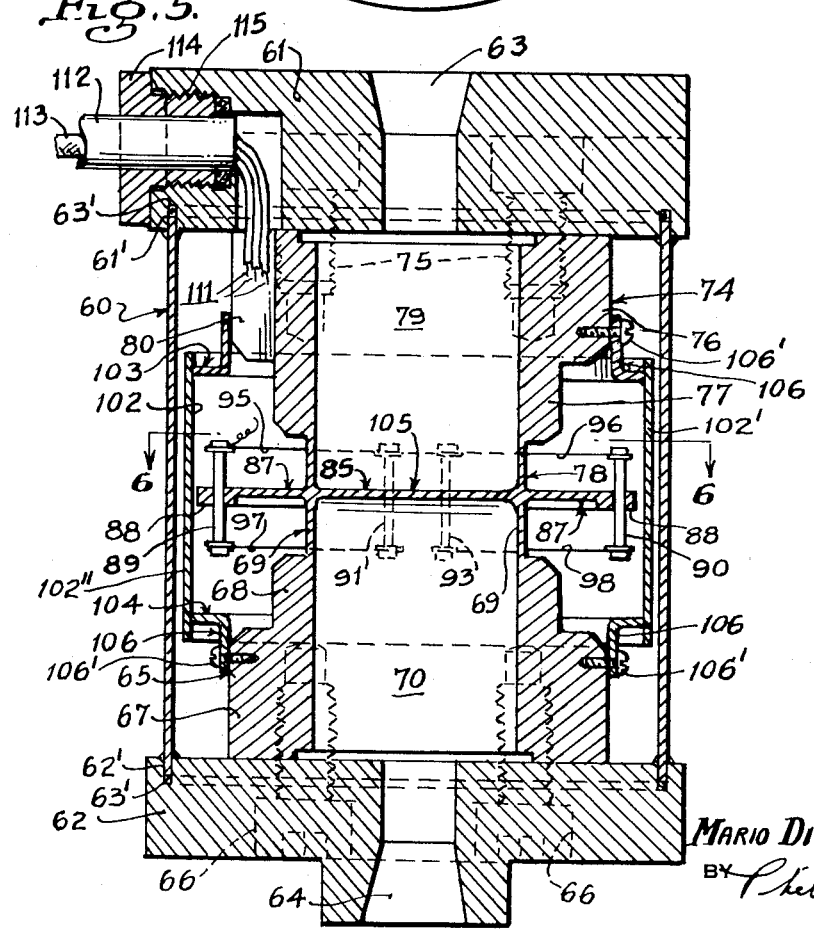
Fig. 5 is a section in elevation of my transducer in the form of a differential pressure gauge, taken on line 5—5 of Fig. 6.
Figure 13:
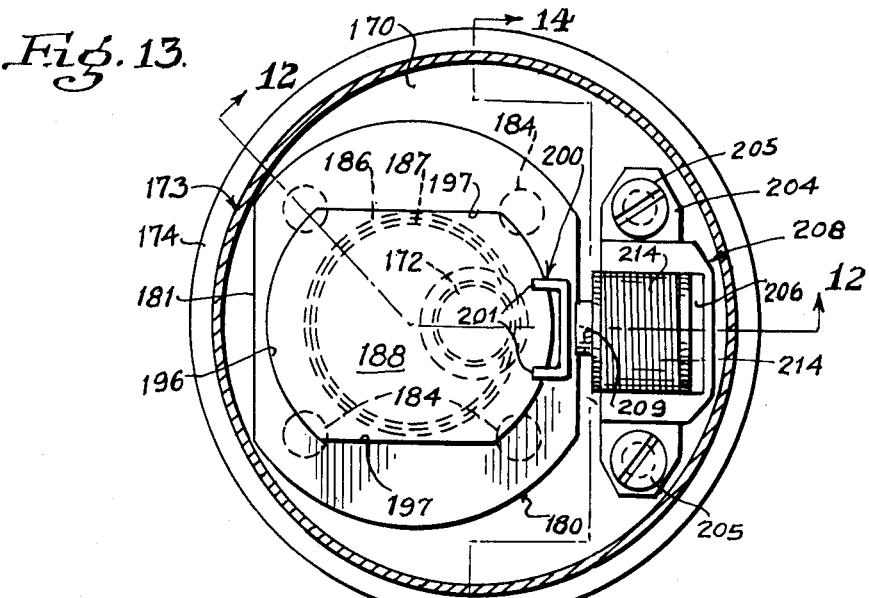
Fig. 13 is a plan view of the device of Fig. 12 taken below the cover.
Figure 12:
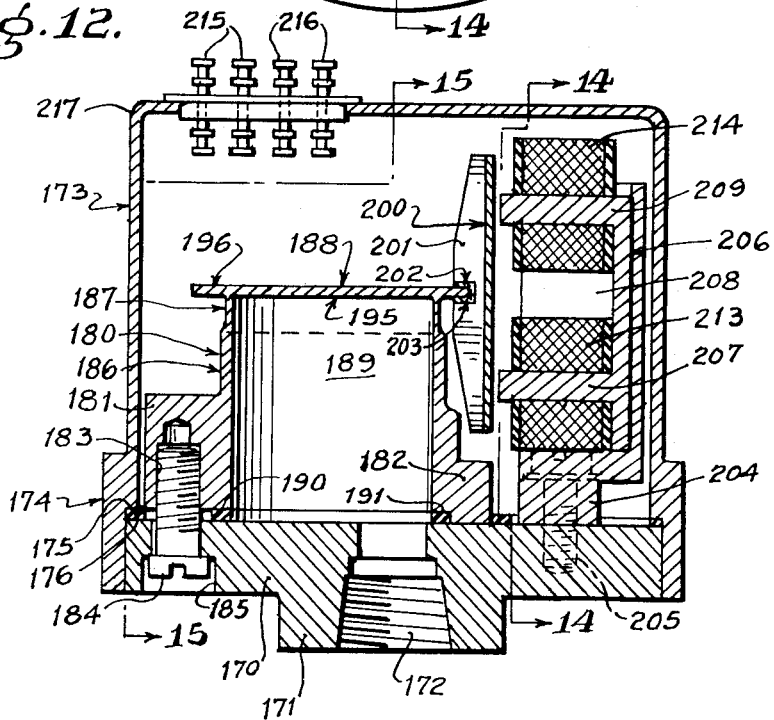
Fig. 12 is an irregular section in elevation of still another embodiment of the invention transducer employed as a pressure gauge, and taken on line 12—12 of Fig. 13.

Referring to Figs. 1 to 4 of the drawing numeral 20 is a cylindrical case having positioned in the lower end thereof a base member 21 having a thick lower portion 22 containing a central threaded bore 23 adapted to receive a pressure fluid fitting. Integral with the base member 21 and extending axially upward therefrom is a cylindrical portion 24 having an outer diameter substantially less than the inner diameter of case 20 and an inner diameter somewhat less than the diameter of the bore 23. The interior 25 of cylinder 24 communicates with bore 23.

The upper end 26 of cylindrical portion 24 is relieved or reduced substantially in thickness to form a flexible support 26, and a diaphragm 27 is integrally connected to the reduced upper end 26 of cylinder 24, and is supported thereon. Diaphragm 27 has a pair of curved end portions 27' (see Fig. 4) and a pair of straight sides 27" parallel to each other and joining the curved ends. It is seen that diaphragm 27 is positioned with its central axis located along the axis of cylinder 24, the outer portion 28 of the diaphragm extending for a distance beyond the reduced upper end 26 of cylinder 24. Thus, on the application of a pressure transmitted by a pressure fluid in chamber 25 against the underside of diaphragm 27, the latter is deflected upwardly at its center portion 29 from its points of flexure at the connection of the diaphragm with the relieved end 26 of the cylinder, while the outer end 28 of the diaphragm is deflected downward from such points of flexure. Since the connection between support 26 and diaphragm 27 is arcuate, i.e., the intersection of the flexible support and the diaphragm is in the form of an arc or circle, the center portion 29 of the diaphragm 27 within the flexible supporting wall 26 will be deflected upward along radial lines of flexure from the flexible support 26 when a pressure is applied through chamber 25, and the relieved or reduced support 26 will tend to flex to accommodate the movement of the diaphragm. Upward flexing of the center portion of the diaphragm produces a downward flexure of the outer portion 28 of the diaphragm from the connection thereof with flexible support 26.

Four support arms 33, 34, 35 and 36, each having a notch 37 in one face substantially at the center of the arm are vertically disposed about the outer periphery of the diaphragm with a peripheral portion of the diaphragm fitted into the notches 37 of said arms and connected thereto by suitable means, such as by welding or brazing, etc. One pair of arms 33 and 34 are connected to the diaphragm at the opposite end of one straight edge 27" thereof, while the other pair of arms 35 and 36 are connected to the diaphragm at the ends of the opposite straight edge 27" of the diaphragm. It is thus seen that arms 33 to 36 are distributed about the periphery of the diaphragm so that one pair of arms 33 and 34 are in one plane on one side of the diaphragm, with the other pair of arms 35 and 36 in another parallel plane on the opposite side of the diaphragm.

As seen in Fig. 3, arm 33 contains a pair of upper and lower insulated pins 40 and 41, and arm 34 has thereon a pair of similar upper and lower pins 42 and 43. Pins 40 and 42 are disposed horizontally opposite each other a substantial distance above diaphragm 27, and pins 41 and 43 are likewise disposed horizontally opposite each other approximately the same distance below the diaphragm. A strain wire 44 is looped in tension between pins 40 and 42, the ends of the wire being connected to terminals 45 located adjacent pins 40 and 42 on arms 33 and 34. A strain wire 46 is likewise looped in tension between pins 41 and 43, the ends of this wire being connected to terminals 47 adjacent pins 41 and 43 on arms 33 and 34. Support arms 35 and 36 on the opposite side of the diaphragm contain the same pins and terminals as arms 33 and 34, with a strain wire 44 looped across the upper pins above the diaphragm, and a wire 46 looped across the lower pins 41 and 43. The upper pair of wires 44 are substantially in a plane parallel to the diaphragm, as are the lower pair of strain wires 46. Electrical wires (not shown) connect the terminals 45 and 47 on the support arms 33 to 36 with the outer terminals 48 in a Wheatstone bridge circuit arrangement, as is well known in the art, the wires 44 and 46 constituting the arms of the bridge. The terminals 48 are mounted on an insulated cover 49 positioned on a flange 50 integral with the upper end of case 20.

The base member 21 has a flange 51 extending outwardly therefrom intermediate the lower portion 22 and the cylindrical portion 24 of said base member, the periphery of the flange being threaded at 52 to receive an internal threaded portion 53 at the lower end of a cylindrical shield 54, the bottom 55 of which abuts the upper surface of base portion 22. A cover 56 fits into the upper end of the shield above arms 33 to 36, and an adjustable stop screw 57 having a nut 57' thereon resting on cover 56 is threaded axially through the cover, the bottom of the screw being positioned a short distance above the diaphragm to limit the extent of bending thereof. Shield 54 and cover 56 protect the diaphragm and its associated structure from the effects of external temperature variations. A slot 58 in cover 56 provides for the passage of the wires (not shown) connecting terminals 45 and 47 with the outer terminals 48.

When the diaphragm 27 is bent upward into the shape of a cap by the applied pressure in cylinder 24, the arms 33 to 36 are pivoted at their connection with the diaphragm, in a direction such that the upper ends of arms 33 and 34 (see Fig. 3) move outwardly away from each other, and the lower ends of said arms approach each other. Also, the upper ends of arms 35 and 36 are pivoted outwardly from each other, while the lower ends of these arms pivot inwardly toward each other. Hence, strain wires 44 above the diaphragm are placed in tension and strain wires 46 below the diaphragm are relaxed. This changes the relative resistances in the bridge circuit, resulting in an output which is proportional to such relative change and thus proportional to the amount of deflection of the diaphragm and to the pressure applied thereto.

It is seen that diaphragm 27 and each of the arms 33 to 36 form a bell crank lever arrangement so that the force against diaphragm 27 can be multiplied by placing the pins 40 and 42 at a greater distance from the diaphragm.

Also, it will be seen that if the instrument is subjected to linear acceleration in a direction normal to the plane of diaphragm 27, e.g., downward as viewed in Fig. 3, the outer portions 28 of the diaphragm beyond the supporting flexible end member 26, tend to bend upward to pivot arms 33 to 36 so as to bring the upper ends thereof closer together while tending to move the lower ends thereof away from each other. But this tendency toward upward bending of the end portions 28 of the diaphragm and the pivoting of arms 33 to 36 is substantially cancelled out by upward bending of the central portion 29 of the diaphragm, which tends to cause the outer end portions 28 of the diaphragm to bend downward against the tendency toward upward bending thereof due to acceleration. Hence, there is little or no resultant change in resistance of the strain wires due to acceleration, and thus essentially no error in output is introduced due to acceleration of the instrument. To obtain this desirable result the mass and stiffness of support arms 33 to 36 should be suitably chosen in relation to the mass of the diaphragm and its stiffness.

Referring now to Figs. 5 to 9, there is illustrated a transducer according to the invention and employed in the design of a differential pressure gauge. In the instant embodiment there is provided a cylindrical case 60, the upper end of which is received in a notch 61' of a heavy pressure cap 61, and the lower end of which is received in a notch 62' of a thick pressure member 62. A gasket 63' is disposed in each of notches 61' and 62' adjacent the ends of the case 60. Pressure cap 61 has a fluid pressure inlet 63, and pressure member 62 a fluid pressure inlet 64. A stepped pressure chamber 65 of cylindrical shape is axially positioned within case 60 adjacent the lower pressure member 62 and is connected thereto by means of bolts 66. Pressure chamber 65 has a thick lower portion 67, an intermediate portion 68 of decreased thickness, and a thin flexible upper portion 69 of cylindrical shape, and the bore 70 of chamber 65 communicates with the pressure fluid inlet 64.

Axially positioned within case 60 adjacent pressure cap 61 is a second pressure chamber 74 of substantially the same size and shape as pressure chamber 65, and connected to cap 61 by means of bolts 75. Pressure chamber 74 has a thick upper portion 76, an intermediate portion 77 of decreased thickness and a thin flexible lower portion 78, the bore 79 of chamber 74 communicating with the pressure fluid inlet 63. It is seen that the bores 70 and 79 of the pressure chambers 65 and 74 are of the same diameter and are in axial alignment, as are the respective wall sections of such chambers, including the adjacent thin cylindrical sections 69 and 78. However, the thick upper section 76 of pressure chamber 74 has a longitudinal groove 80 therein for a purpose pointed out hereinafter. It is noted that the bolts 66 and 75 connecting the end members 61 and 62 with the pressure chambers 65 and 74 also hold the ends of cylindrical case 60 in position in the notches 61' and 62' of such end members 61 and 62.

A diaphragm 85 substantially in the form of a square with its corners rounded off as at 86 and 86' (see Fig. 6) is integrally connected between the adjacent ends of the thin portions 69 and 78 of the pressure chambers 65 and 74. It is seen that the diaphragm 85 has an outer peripheral portion 87 extending beyond the thin wall sections 69 and 78 of the pressure chambers. Adjacent its peripheral edge the diaphragm is reinforced as shown at 88 to receive and hold in position a pair of oppositely disposed insulated pins 89 and 90 located near the two opposite rounded corners 86 of the diaphragm, and two pairs of oppositely disposed pins 91 and 92, and 93 and 94, said pairs of pins being positioned adjacent the two other oppositely disposed rounded corners 86' of the diaphragm. Pins 91 and 93 in one corner 86' of the diaphragm are located closely adjacent but spaced from each other, as are pins 92 and 94 in the opposite corner 86'. The pins pass through apertures in the diaphragm forming a press fit therewith, and said pins are positioned normal to the plane of the diaphragm, extending a substantially equal distance above and below the same.

Stretched in tension between the upper ends of pins 91, 89 and 92 is an electrical resistance strain wire 95, and stretched in tension between the upper ends of pins 93, 90 and 94 is a strain wire 96. A strain wire 97 is connected in tension between the lower ends of pins 91, 89 and 92, and a fourth strain wire 98 is connected between the lower ends of pins 93, 90 and 94. It is noted that strain wires 95 and 96 are located in a plane above the diaphragm 85 and parallel thereto, while strain wires 97 and 98 are disposed in a plane below diaphragm 85 and parallel thereto.

A cylindrical shield 102 formed in two longitudinally extending half sections 102' and 102'', and having an annular top member 103 and bottom member 104 is disposed about the diaphragm 85 and its associated structure including the pins and strain wires. The outer periphery of the shield 102 is positioned closely adjacent the inner wall of case 60, and the vertical flanges 106 at the inner periphery of the annular top and bottom members 103 and 104 are connected by screws 106' to the outer surface of the end portions 67 and 76 of pressure chambers 65 and 74. The shield 102 protects the strain wire structure from the effects of external temperature variations.

It is seen that when pressure fluids having two different pressures are introduced through inlets 63 and 64 into pressure chambers 79 and 70, and applied against opposite faces of diaphragm 85, the diaphragm will bend or bulge outward at its center portion 105 into the pressure chamber, the fluid in which is under a lower pressure than the fluid in the opposite chamber, and the end portion 87 of the diaphragm will bend in the opposite direction about the thin flexure members 69 and 78. This will produce a pivotal motion of the pins such that the ends of the pins on the convex side of the deflected diaphragm will move away from each other, while the ends of the pins on the concave side of the deflected diaphragm will pivot toward each other. The result will be a tensioning of the strain wires on the convex side of the diaphragm and a relaxing of the wires on the concave side of the diaphragm.

The ends of the strain wires 95, 96, 97 and 98 are connected to terminals 109 (see Figs. 8 and 9) located in the wall of the intermediate section 77 of pressure chamber 74, to form a Wheatstone bridge circuit, as is well known in the art, the four strain wires forming the arms of said bridge. The six terminals 109 are furnished to provide additional connections into the bridge, e.g., an additional resistance for temperature compensation, as is well known. Terminals 109 are then connected in known fashion by wires (not shown) to terminals 110 positioned in the wall of section 76 of pressure chamber 74, forming the four connections of the bridge. Wires 111 connect terminals 110 with a plug 112, from which such wires are conducted externally within a cable 113. The plug 112 is received within a flanged sleeve 114 which is threaded at 115 into the pressure cap 61.

From the foregoing, it is seen that if the pressure fluid in the bore of chamber 65 is under a greater pressure than the fluid in the bore of upper chamber 74, the central portion 105 of diaphragm 85, between the points of flexure at walls 69 and 78 will bend upward into bore 79 of the upper chamber, and the outer portion 87 of the diaphragm beyond flexure members 69 and 78 will bend downward therefrom. The result of this bending of the diaphragm due to the differential pressure of the fluids in chambers 65 and 74 will be a pivotal movement of the pins from their fulcrum points at their connection with the diaphragm, so that the upper ends of the pins 89, 91 and 92, and of pins 90, 93 and 94 move away from each other, while the lower ends of these two sets of pins pivot toward each other. This produces a tensioning of strain wires 95 and 96 above the diaphragm, and a relaxation in strain wires 97 and 98 below the diaphragm. The change in tension in the wires produces a relative change in resistance therein and an output from the bridge circuit, which is proportional to the degree of the pivotal motion of the pins and hence of the bending of the diaphragm, and thus is proportional to the differential pressure applied against the diaphragm.

As in the case of the embodiment of Figs. 1 to 4, it is seen that a bell crank lever arrangement is formed by the diaphragm 85 and each of the pins connected thereto, the fulcrum of the bell crank being at the connection of the diaphragm with flexure members 69 and 78. Thus, the force applied in tensioning the strain wires can be multiplied by lengthening the pins so that the strain wires connected to the ends of the pins will be disposed at a greater distance from the diaphragm, thus lengthening one of the lever arms of the bell crank.

The addition of metal along the peripheral edge of diaphragm 85 to form a thick peripheral portion 88 functions, in addition to reinforcing the diaphragm, to add mass to the outer end of the diaphragm, to thus reduce the effect of acceleration on the instrument or render the instrument substantially insensitive to acceleration forces. Hence, the thickened portion 88 at the outer end of the diaphragm serves in the same manner as the arms 33 to 36 in the device of Figs. 1 to 4 to cancel out the tendency toward bending of the outer portion 87 of the diaphragm due to forces of acceleration.

If desired, it is seen that the device of Figs. 5 to 9 can be changed to a gauge for measuring the pressure of a single fluid by removing one of the pressure chambers, for example, pressure chamber 74. In this manner, the pressure of the fluid in chamber 65 causing a bending of the diaphragm, as pointed out above, can be measured directly in the manner described above.

The embodiment of Figs. 5 to 9 is disclosed and claimed in my co-pending application Serial No. 515,112, filed June 13, 1955.

In Figs. 10 and 11 is illustrated another embodiment of the invention transducer. The instant embodiment may be employed for measuring a force, a pressure or an acceleration. The device comprises a cylindrical base member 120 which is externally threaded at 121 for attachment to a device for measuring a force associated therewith, or the linear acceleration of such device along the longitudinal axis of the transducer. The upper portion of base member 120 has a flange 122 forming a shoulder 123 with the upper surface 124 of such member. Integral with the upper portion of base member 120 and extending upwardly along the axis thereof is a hollow cylindrical portion 125 having a chamber or bore 126 therein which communicates and is axially aligned with an axial bore 127 formed in the body of base member 120, bores 126 and 127 having the same diameter. Bore 127 extends almost completely through the base member, the bottom of said bore forming a relatively thin diaphragm 128. A thin cylindrical lip 129 extends upwardly from the upper end of the cylindrical portion 125, said lip being disposed inwardly from the outer periphery of said cylindrical portion 125, to form a shoulder 125'.

A diaphragm 130 is axially mounted on a depending thin, flexible cylindrical support 131 integral with said diaphragm and disposed inwardly some distance from the outer periphery of diaphragm 130. Support 131 is of an internal diameter slightly greater than the outer diameter of lip 129, and the lower end of support 131 is positioned about lip 129 in abutting relation thereto to prevent lateral movement of said support and diaphragm 130, and said lower end of support 131 is connected to shoulder 125', e.g., by brazing at 132. Diaphragm 130 has a central hub 133 which is threaded at 134 to receive a rod 135 which extends axially into bores 126 and 127 and has a reduced threaded lower end 136 which is received in a central internally threaded hub 137 in the upper surface of diaphragm 128. A lock nut 138 and washer 139 are received over the upper end of rod 135 to prevent rotation of the rod and axial movement thereof with respect to diaphragm 130.

Diaphragm 130 is in the form of a square with its corners rounded off as at 143 and 144, similar to diaphragm 85 of the embodiment of Figs. 5 to 9. Connected to the outer portion 145 of diaphragm 130 beyond the cylindrical support member 131 is a pair of oppositely disposed insulated pins 146 and 147, each located near one of the two opposite rounded corners 143 of the diaphragm. Also, two pairs of oppositely disposed pins 148 and 149, and 150 and 151 are connected to the outer portion 145 of diaphragm 130, adjacent the two other oppositely disposed rounded corners 144 of the diaphragm. Pins 148 and 150 in one corner 144 of diaphragm 130 are located closely adjacent but spaced from each other, as are pins 149 and 151 in the opposite corner 144. The pins pass through apertures in diaphragm 130 and are held by a press fit therein, the pins being disposed normal to the plane of the diaphragm and extending above and below said diaphragm.

An electrical resistance strain wire 154 is stretched in tension between the upper ends of pins 148, 146 and 149, and a strain wire 155 is stretched in tension between the upper ends of pins 150, 147 and 151. Also connected in tension between the lower ends of pins 148, 146 and 149 is a third strain wire 156, with a fourth strain wire 157 stretched across the lower ends of pins 150, 147 and 151. It is seen that strain wires 154 and 155 are positioned in a plane above diaphragm 130 and parallel thereto, with strain wires 156 and 157 located in a plane below diaphragm 130 and parallel thereto.

A cylindrical case 160 is mounted at its lower end on shoulder 123 on the upper outer end of base member 120 and abutting the inner periphery of the flange 122 thereof. Integral with the inner wall of case 160, and positioned in the upper portion thereof above diaphragm 130 and its strain wire structure, is an internal flange 161. Four bolts 162 pass through flange 161, said bolts extending parallel to the axis of the instrument with their lower ends threaded into tapped holes 164 in the upper surface of the base member 120, to affix the case 160 to the base member. A cover 163 is positioned on flange 161, and on cover member 163 is supported a series of terminals 165 for a purpose noted hereinafter. Case 160 surrounds and protects the diaphragm 130 and its associated pins and strain wire structure from the effects of external temperature variations.

It is seen that when an upward force or pressure is applied against the diaphragm 128, rod 135 will be forced upward, causing diaphragm 130 to bend or deflect upward at its center portion 166 between the points of flexure of the diaphragm at its connection with the cylindrical support 131, and the outer portion 145 of the diaphragm 130 beyond the flexure member 131 will deflect downward therefrom. This produces a pivotal motion of the pins 146 to 151 such that the upper ends of the pins 146, 148 and 149, and of pins 147, 150 and 151 are displaced away from each other, while the lower ends of these two sets of pins pivot toward each other. The result is a tensioning of strain wires 154 and 155 above diaphragm 130, and a relaxation of the wires 156 and 157 below the diaphragm. The change in tension of the wires causes a proportional change in resistance therein. The ends of wires 154 to 157 are connected to terminals 165 to form a conventional bridge circuit, each of wires 154 to 157 forming an arm of the bridge circuit, and said change in resistance of the strain wires produces an output from such circuit which is proportional to the degree of pivotal motion of the pins 146 to 151 and hence to the bending of diaphragms 130 and 137, and thus is proportional to the force applied against the latter diaphragm.

If a downward force is applied against diaphragm 128, rod 135 will transmit said force to diaphragm 130, causing it to deflect or bend downward at its center portion 166 between the cylindrical support 131, with the outer portion 145 of diaphragm 130 deflecting upwardly. This produces pivotal motion of the pins 146 to 151 in a direction opposite to that described in the above paragraph, resulting in a tensioning of strain wires 156 and 157 below diaphragm 130 and a relaxation of strain wires 154 and 155 above said diaphragm. The consequent change in resistance of the strain wires produces an output from the bridge circuit proportional to the degree of bending of diaphragm 130 and to the force transmitted thereto by rod 135, as described above.

If desired, the embodiment of Figs. 10 and 11 can be modified to employ the device as a linear accelerometer. This can be accomplished by eliminating diaphragm 137 and connecting the lower end of rod 135 to a weight or mass suspended on the rod. Linear acceleration of the device, e.g., in a downward direction, as viewed in Fig. 10, will produce an upward acceleration force against rod 135, causing the rod to actuate diaphragm 130 to bend it and produce an output from the bridge circuit as a result of consequent change in resistance of the strain wires.

In Figs. 12 to 16 is shown a transducer according to the invention, the motion sensing means associated therewith being of the inductive or electromagnetic type. The device comprises a cylindrical base 170 having a central flange 171 containing a threaded inlet 172 for a fluid pressure connection. A cylindrical case 173 is press fitted over the bottom member 170, the lower end of the case carrying a flange 174 which surrounds the outer periphery of base member 170 in snug abutting relation. The inner wall of flange 174 is stepped to provide a shoulder 175 which rests against a gasket 176 disposed about the upper surface of the base member adjacent the peripheral edge thereof.

A housing 180 is positioned on base member 170 within the case 173, said housing being disposed mainly on one side of said base. The housing has thickened wall sections 181 and 182 with tapped holes 183 therein for receiving bolts 184 passing through base member 170 for connecting said housing with said member, the heads of said bolts being disposed in recesses 185 in said base member. The upper section of housing 180 has a reduced wall thickness, indicated at 186, and the upper adjacent end of the housing is reduced still further to form a flexible cylindrical support 187 for a diaphragm 188. The interior chamber 189 of housing 180 is cylindrical and communicates with the fluid pressure inlet 172, and a gasket 190 is provided in a groove 191 of the housing between the lower end of chamber 189 and the upper surface of base member 170.

Diaphragm 188 is positioned axially above chamber 189 and is formed integral with the flexible support member 187. Support member 187 is disposed intermediate the ends of the diaphragm, with the center section 195 thereof within said support member and the outer peripheral portion 196 of the diaphragm located beyond the support member. The diaphragm 188 is of general circular shape having two opposite chordal sections removed therefrom to form straight parallel opposite sides 197 (see Fig. 13). A plate 200 is provided having a pair of side flanges 201 (see Fig. 16) extending at right angles to the plate along the longitudinal edges thereof, with a pair of oppositely disposed central notches 202 therein. The plate 200 is positioned on the periphery of the diaphragm with an outer peripheral portion of the diaphragm received in said notches 202, and the diaphragm portion within the notches is brazed or soldered as at 203 to the plate. It is seen that the plate 200 is positioned normal to the plane of the diaphragm and forms an armature, which is constructed of a material having suitable magnetic permeability, as for example, iron.

Mounted in front of the plate or armature 200 on a support member 204 which is connected to the base 170 of the instrument by the screws 205, is a bracket 208 carrying an iron core 206 having pole pieces 207 and 209. The support member 204 is so positioned that the pole pieces are spaced from the armature. The core legs 207 and 209 have positioned thereon coils 213 and 214, coil 213 being connected to terminals 215 by wires (not shown) and coil 214 being connected to terminals 216 by wires (also not shown), said terminals extending through the top 217 of the case.

It will be observed that introduction of pressure fluid into the chamber 189 and against the diaphragm 188 will cause the central portion 195 of the diaphragm to flex or bend upwardly about the thin flexure member 187 supporting the diaphragm, and produce a downward bending of the outer portion 196 of the diaphragm beyond the thin flexure member 187. Since the supporting flexure member 187 is of cylindrical shape, there will be a radial flexing of diaphragm 188 into the shape of a cap. Thus, the downward bending of the outer portion 196 of the diaphragm will cause pivotal motion of plate or armature 200 in a clockwise direction about the pivot point of the plate at its central notches 202. This brings about an approaching of the armature to pole piece 209 and a departure of the armature from pole piece 207, changing the air gap at the pole faces. This increases the reluctance in the magnetic path about coil 213 and decreases the reluctance in the magnetic path about coil 214. The resultant change in the inductance of the two coils may be measured by any conventional means and related to the angular motion of the armature 200, as will be understood by those skilled in the art. Such change in inductance will of course be proportional also to the extent of flexure of the diaphragm, and hence to the pressure applied thereto.

The positioning of the armature plate 200 at the peripheral edge of diaphragm 188 also functions to minimize the undesired effect of forces of acceleration on the instrument, essentially in the manner described above in connection with the arms 33 to 36 in the embodiment of Fig. 1.

Instead of employing a single armature 200 and one pair of coils associated therewith, a plurality of such armatures can be mounted at spaced intervals along the periphery of diaphragm 185, each of said armatures having a separate coil and pole piece structure. In this manner the range and sensitivity of the instrument can be increased. Also, the sensitivity of the device can be increased by increasing the length of the armature plate 200, and by increasing the distance between the pole pieces 207 and 209 and the diaphragm 188. This increases the length of the lever arm formed by the diaphragm and plate 200, so that flexing of the diaphragm produces increased pivotal motion of the portions of the armature opposite the pole pieces.

The device of Figs. 12 to 16 is disclosed in my copending application Serial No. 515,196, filed June 13, 1955.

In Fig. 16a is illustrated use of an inductive type motion sensing means instead of the strain wire device employed in the structure of Figs. 5 to 9. Said inductive type motion sensing means is the same as that used in the device of Fig. 12. The parts of Fig. 16a have the same numerals as the corresponding parts of Figs. 5 and 12, except for the diaphragm, which is somewhat different from that of Fig. 5 in that the outer peripheral portion 87' of diaphragm 85' in Fig. 16a does not have a thickened outer section as in the case of the peripheral portion 87 of diaphragm 85 shown in Fig. 5.

It will be observed that introduction of pressure fluid into the bore 70 of chamber 65 in Fig. 16a, said fluid having a greater pressure than the fluid in bore 79 of chamber 74, will cause the central portion 105' of the diaphragm 85' to flex or bend upwardly about the thin flexure members 69 and 78 supporting the diaphragm, and produce a downward bending of the outer portion 87' of the diaphragm beyond such flexure members. Since the supporting flexure members 69 and 78 are of arcuate shape, there will be a radial flexing of diaphragm 85' into the shape of a cap. Thus, the downward bending of the outer portion of the diaphragm will cause pivotal motion of plate or armature 200 thereon in a clockwise direction about the pivot point of the plate at the notches 202. This brings about an approaching of the armature to pole piece 209 and a departure of the armature from pole piece 207, changing the air gap at the pole faces. This increases the reluctance in the magnetic path about coil 213 and decreases the reluctance in the magnetic path about coil 214. The resultant change in the inductance of the two coils is related to the angular motion of the armature 200 and will of course be proportional also to the extent of flexure of the diaphragm, and hence to the differential pressure applied thereto.

If the pressure of the fluid in bore 79 is greater than the fluid in bore 70, diaphragm 85 will flex in the opposite direction from that noted above.

In the embodiments of the invention illustrated, the flexible support for the flexible beam or diaphragm, e.g., the thin upper end 26 of pressure chamber 24 in Fig. 1, has an arcuate or cylindrical cross section and is disposed substantially normal to the plane of the diaphragm. However, if desired, as shown in Figs. 17 and 18, the flexible support or supports 220 for the beam or diaphragm 221 can be planar, so that the intersection of such supports with the flexible beam 221 is substantially along parallel lines 222. The flexible supports 220 are mounted by suitable means on rigid support members 223. A force transmitting rod 224 is threaded into the center of beam 221 midway between the flexible supports 220. Pins 225 are vertically positioned at the ends of outwardly extending end members 226 which are connected to the opposite ends of the beam 221, said end members having increased thickness to aid in supporting said pins. Strain wires 227 are connected across the upper ends of pins 225 and strain wires 228 are looped in tension across the lower ends of pins 225.

When a force is transmitted by rod 224 against the central portion 229 of the flexible beam 221 between the supports 220, so that the beam is subjected to an upward pressure to deflect said portion 229 upward to the dotted line position shown, the outer ends 230 of the beam are deflected downward from supports 220 and said supports will be deflected to accommodate flexure of the beam. Deflection of the beam 221 takes place along parallel lines of flexure extending perpendicular to the lines of intersection 222 of the beam with the flexible supports 220. On downward deflection of the outer portions 230 of the beam beyond the supports 220, the upper strain wires 227 are strained, while the lower strain wires 228 are relaxed to produce an output corresponding to the consequent change in resistance of the wires and to the force causing deflection of the beam 221.

Also, as seen in Figs. 19 and 20, the flexible supports 235 supporting the flexible beam or diaphragm 236 can be disposed at an acute angle thereto, such flexible supports being in turn mounted on rigid supports 237. Supports 235 have an arcuate cross section, as seen in Fig. 20, and intersect beam 236 along arcs shown at 237'. Pins 238 are mounted in outer end members 239 of the diaphragm, and strain wires 239' and 240 are connected across the upper and lower ends respectively of the pins. A force transmitting rod 241 is threaded into the center of beam 236. When the beam 236 is subjected to an upward force transmitted by rod 241 so as to deflect the beam to the dotted line position, shown in Fig. 19, the flexible supports 235 will bend, and flexure of beam 236 takes place along radial lines of flexure extending from the arcs 237', causing the central portion 242 of the beam between supports 235 to deflect upwardly into the shape of a cap, with the outer ends 243 of the beam beyond said supports deflected downwardly. The resistance of strain wires 239' and 240 will change, due to change in tension therein as result of the deflection of the beam 236 in proportion to the force transmitted by rod 241, as previously described.

If a downward force is transmitted by rod 224 or 241 to the associated beam 221 or 236, the center of the respective beams between the flexible supports 220 or 235 will be deflected downward with the outer ends 230 or 243 of said beams flexing upwardly. This will increase the tension in the lower strain wires 228 or 240, while relaxing the upper strain wires 227 or 239', thus changing the resistance of these wires and the output in proportion to the downward force transmitted by said rods to said beams.

As indicated in Figs. 19 and 20, it is seen that, if desired, the flexible supports 26, 69, 78, 131 and 187 of Figs. 1, 5, 10 and 12 can be disposed at an angle other than a right angle to their respective diaphragms instead of being positioned substantially normal thereto.

Further, if desired, the flexible beam or diaphragm, instead of being in planar form, can be initially curved. Thus, when the diaphragm is subjected to a force or pressure, said diaphragm will be bent into an arc of greater or smaller radius than that in its initial position, with the transducer or motion sensing means being actuated as a result of such bending of the diaphragm.

Figure 21:
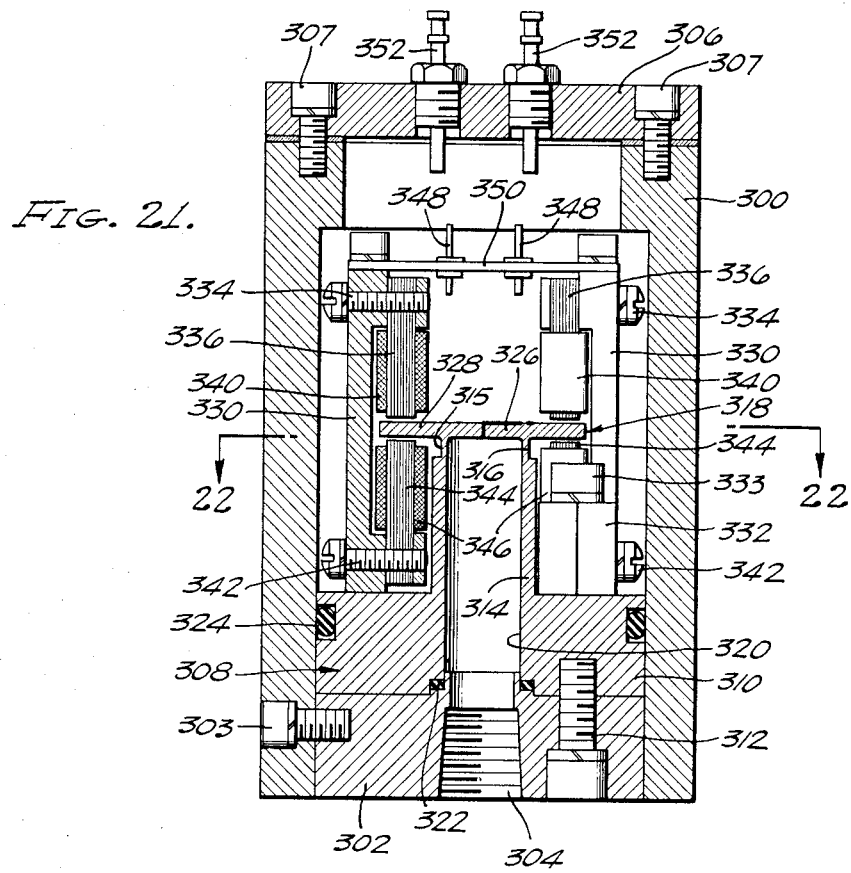
Fig. 21 is a sectional elevation of a modification of the device of Fig. 12.
Figure 22:
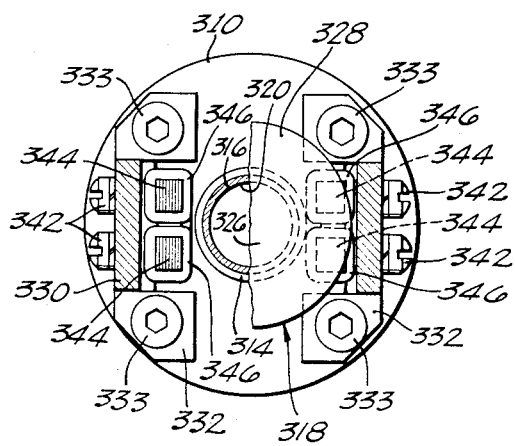
Fig. 22 is an irregular horizontal section taken on line 22—22 of Fig. 21.

Referring to Figs. 21 and 22, showing another modification employing an inductive type motion sensing means, numeral 300 represents the outer case having a plug 302 connected at one end thereof by means of studs 303, said plug having a central fluid pressure inlet 304, and a cover 306 connected by suitable fasteners 307 to the other end of case 300. A pressure fluid housing 308 is positioned within the case, and comprises a thick base portion 310 resting on the upper surface of plug 302 and fixed thereto by a stud 312, and an integral upper section 314 of reduced wall thickness. The upper end of wall section 314 is reduced still further by formation of a groove 315 therein to form a flexible cylindrical support 316 for a circular diaphragm 318. The pressure inlet 304 communicates with the cylindrical interior chamber 320 of housing 308. An O-ring seal 322 is provided in a groove between the lower end of housing 308 and the upper surface of plug 302, and a seal 324 is also provided between the outer periphery of base member 310 and the inner wall of the case.

Diaphragm 318 is positioned axially above the cylindrical chamber 320 and is formed integral with flexible support member 316. Support member 316 is positioned intermediate the ends of the diaphragm, the center section 326 thereof being within support 316, and the outer peripheral portion 328 of the diaphragm being located outside said support. The diaphragm 318 is designed so that the mass and stiffness of the outer portion 328 of the diaphragm are respectively substantially equal to the mass and stiffness of the central portion 326 of the diaphragm. The diaphragm is formed of a material having suitable magnetic permeability, e.g., iron, to function as an armature in a magnetic circuit as pointed out more fully below.

A vertical plate 330 having a pair of integral feet 332 at the bottom of the plate, is positioned on base member 310 at one side of diaphragm 318 with the feet 332 connected to base member 310 by fasteners 333. Supported from the upper end of plate 330 by a pair of screws 334 are a pair of depending laminated posts 336 spaced from each other. Posts 336 each have mounted thereon a coil 340, the ends of coils 340 being connected together. Carried by a pair of screws 342 at the bottom of plate 330 are a second pair of vertical laminated posts 344 like 336 and in axial alignment therewith. Posts 344 each carry a coil 346, the ends of coils 346 being connected together.

Directly opposite diaphragm 318 from the arrangement of coils and associated structure described above, and positioned to the right as seen in Fig. 21, is a similar arrangement of coils and associated structure, like numerals thereof representing like parts of the coil structure previously described. Thus it will be seen that there are four coils 340 mounted above the diaphragm adjacent the outer periphery of the upper surface thereof, two on each side of the diaphragm, and four coils 346 are positioned below the diaphragm adjacent the periphery of the lower surface thereof, the lower coils being aligned with the upper coils. The ends of the wires of each pair of the four pairs of adjacent coils 340 or 346 are connected by wires (not shown) to terminals such as 348 mounted on a plate 350 positioned on plates 330, to form a bridge circuit, each pair 340 or 346 of the four pairs of adjacent coils constituting one arm of the bridge. Terminals 348 are in turn connected to outer terminals 352 by additional leads (not shown) for connection to a source of potential and an indicating instrument, e.g., a galvanometer, in a well known manner.

Pressure fluid introduced into chamber 320 via inlet 304 causes an upward flexing of the central portion 326 of diaphragm 318 on the flexure 316, and a downward bending of the outer portion 328 of the diaphragm beyond the flexure 316. This will cause the periphery of the diaphragm to approach the upper ends of the lower laminated cores 344 of all four lower coils 346, and to move away from the lower ends of the upper laminated cores 336 carrying coils 340. This decreases the length of the gaps between the diaphragm and the adjacent ends of the lower pole pieces 344 and increases the length of the gap between the diaphragm and the adjacent ends of the upper pole pieces 336. This produces a change in the reluctance in the magnetic paths about the respective coils, the diaphragm serving as armature, and causes a change in inductance of the coils 340 and 346 and in the output of the bridge, in proportion to the amount of bending imparted to diaphragm 326 by the pressure in chamber 320.

Should the instrument be subjected to acceleration in a direction normal to the diaphragm 318, since the mass and stiffness of the outer portion 328 of the diaphragm are substantially equal, respectively, to the mass and stiffness of the central portion 326 of the diaphragm, the tendency of said central portion to flex in one direction will be offset by an equal tendency of the outer diaphragm portion to flex in the opposite direction. The net result will be that substantially no flexing of the diaphragm occurs as the result of such acceleration, and the instrument is thus rendered substantially insensitive thereto.

Where the fluid whose pressure is to be measured in chamber 320 is corrosive to the material of high magnetic permeability of which the diaphragm is formed, the diaphragm can be made in two parts. Thus, the central portion 326 of the diaphragm can be formed of a material which is not attacked by the pressure fluid, and the outer overhanging peripheral portion 328 of the diaphragm which is not contacted by the pressure fluid, can be formed of a separate magnetically permeable material, the outer ring portion 328 being connected in any suitable manner to the periphery of the central diaphragm portion 326.

Now referring to Figs. 23 and 24, numeral 360 represents a case, the lower end of which is closed by a pressure cap 362 connected to the bottom of the case in the manner noted below. Pressure cap 362 has a central pressure inlet 364 which communicates with a conduit or chamber 366 formed axially in an upwardly extending cylindrical portion 368 integral with cap 362. Connected to cap 362 by cap screws 370, and disposed about the cylindrical portion 368, is a base member 372. Member 372 is secured by welding at 374 to the lower end of case 360, to thereby support both 372 and the cap 362.

Base 372 has an upwardly extending cylindrical section 376 disposed about the upper end of cylindrical portion 368, wall section 376 being reduced at its upper end by formation of a groove 379 in wall 376, to form a flexible cylindrical support 378 for a circular diaphragm 380. Diaphragm 380 is positioned axially above cylinder 368 and chamber 366 therein, and is integral with flexible support 378. Support 378 is positioned within the outer periphery of diaphragm 380 so that the outer peripheral portion 382 thereof overhangs the support 378 and the central portion 384 of the diaphragm is disposed within said support.

A pair of semicircular supporting plates 385 and 386 are positioned on base member 372 and disposed about the upper cylindrical section 376 thereof, plates 385 and 386 being connected to said base member by screws 388. Plates 385 and 386 are insulated from base 372 by a sheet of insulation 383 disposed between said plates and base member 372. These plates are separated at their adjacent ends indicated at 387. Connected about raised inner peripheral portions 389 of plates 385 and 386 is a circular condenser plate 390, suitable insulation material indicated at 392 being disposed between said raised peripheral portions and plate 390. A lead 394 connects condenser plate 390 to a terminal 396 on plate 385. Carried on the lower surface of the outer peripheral portion 382 of diaphragm 380 is a second condenser plate 398, said plate being separated from the diaphragm by suitable insulation material indicated at 400. The condenser plates 390 and 398 are separated from each other by an air gap 399. Condenser plate 398 is connected by a lead 402 to a second terminal 404 positioned on the lower condenser plate support 386. Leads 406 connect terminals 396 and 404 with a pair of external terminals 408 mounted on a cover 410 soldered at 412 to the top of the case. Thus, plates 390 and 398 form a condenser having an air gap 399, said condenser being in a circuit including terminals 408, which are connected externally in known manner to a source of potential and an indicating instrument, both not shown.

It is noted that the diaphragm 380 and condenser plate 398 are designed so that the mass of the outer peripheral portion 382 of the diaphragm and the mass of condenser plate 398 together, are substantially equal to the mass of the central portion 384 of the diaphragm, and so that said central portion of the diaphragm has a stiffness substantially equal to said outer peripheral portion of the diaphragm.

A yoke 414 is positioned over the diaphragm 380 and connected adjacent the outer periphery of base member 372 by screws 416. An adjustable stop screw 418 is positioned centrally in said yoke above the center of diaphragm 380 to limit the outer deflection thereof.

Pressure fluid introduced into chamber 366 via inlet 362 will cause the central portion 384 of diaphragm 380 to flex or bulge upwardly, producing a corresponding downward deflection of the outer peripheral portion 382 of the diaphragm carrying condenser plate 398. This causes the upper condenser plate 398 to approach the lower condenser plate 390, thereby changing the distance between these plates across gap 399. The result is a change in capacitance of the condenser which is indicated in the external circuit, corresponding to the deflection of diaphragm 380 and the pressure in chamber 366.

Since the combined masses of the outer portion 382 of the diaphragm and the condenser plate 398 carried thereby are made substantially equal to the mass of the central portion 384 of diaphragm 380, and since the stiffness of said outer peripheral and central portions of the diaphragm are designed to be essentially the same, any acceleration of the instrument along the axis of the diaphragm will tend to produce equal but opposite deflection of the outer portion 382 and the central portion 384 of the diaphragm, resulting in substantially zero deflection of the diaphragm, and rendering the instrument insensitive to such acceleration.

If desired, the inductive motion sensing means employed in the differential pressure gauge of Fig. 16a, may be replaced by the capacitance type motion sensing means shown in Fig. 23, including the condenser plates and associated structure thereof.

From the foregoing, it is seen that I have designed a transducer of simplified structure, in certain modifications of which the motion sensing means is more directly associated with the movable diaphragm than in the prior art devices, eliminating linkages heretofore employed between the diaphragm and motion sensing means. In such modifications, where a strain wire gauge is used as the motion sensing means, the pins for mounting the strain wires can be connected directly to the flexible beam or diaphragm, and my device thus embodies a bell crank lever mechanism providing a mechanical advantage from the force applied to the beam to the force applied in tensioning the strain wires, permitting increased sensitivity of the instrument for response to a rectilinear force or motion. In other modifications of my device employing inductance or capacitance type motion sensing means, the motion sensing means may be directly or indirectly associated with the flexible beam or diaphragm. Further, the device of the invention incorporates means to minimize or substantially eliminate response of the instrument to forces of acceleration to which the instrument may be subjected in use, thus reducing errors in the physical characteristics being measured, such as force or pressure, and rendering the instrument substantially non-responsive to such acceleration forces. My device is moreover easily assembled, is durable and reliable in operation.

In the embodiments of the invention shown and described above, it is noted that the pressure or force is applied to the portion of the diaphragm intermediate its points or location of connection with the flexible support or flexure member. Thus, for example, in the embodiment of Fig. 1, pressure is applied to the central areas 29 of diaphragm 27 within the flexible support or flexure member 26. Likewise, in the modification of Fig. 17, force is transmitted by rod 224 to the center areas 229 of diaphragm 221 between the points or location of connection of flexure member 220 with said diaphragm. Thus, for example, when pressure is applied through pressure chamber 24 against diaphragm 27, the central portion 29 of the diaphragm will be bent upward presenting a concave lower surface to the upper end of the pressure chamber, with the fibers in said lower surface in compression and the fibers in the upper convex surface of the diaphragm placed in tension. The outer ends 28 of the diaphragm are thus bent downwardly from flexure 26. If a vacuum is applied in pressure chamber 24 rather than a positive pressure, the central portion 29 of diaphragm 27 will be deflected downwardly on flexure member 26, while the outer ends of the diaphragm will be bent upwardly from flexure 26.

However, if desired, the force or pressure can be applied to the outer end of the flexible beam or diaphragm of my device beyond the connection of said beam or diaphragm with said flexure member. For example, in Fig. 17, rod 224 can be connected to the outer end 230 of diaphragm 221 instead of to the central portion 229 thereof. In the latter case, movement of the rod upwardly as viewed in Fig. 17, in response to an applied force will cause the outer portion 230 of the diaphragm to deflect upwardly from its connection with flexure 220, and the central portion 229 to deflect downwardly in the opposite direction.

The relative stiffness of the flexible support or flexure member of my device and the stiffness of the strain wires employed can vary. Thus, said flexure can be stiffer or less stiff than said wires, depending on whether the system is of the high energy or low energy type. A high energy system requires a large force for a given displacement of the motion sensing means, while a low energy system requires a relatively small force for the same displacement. In a high energy system the stiffness of the diaphragm or flexible beam is also stiffer than the strain wires. In practice, the thickness of the flexure is made about one-third the thickness of the diaphragm. However, this is essentially a matter of machining practicability, and this thickness ratio can be made to vary as desired.

For a given rigidity of diaphragm or flexible beam, the weaker the flexure member the greater the deflection at the ends of the diaphragm beyond said flexure member, on the application of a force to the center or outer ends of the diaphragm. Hence, in a low energy system employing a weak flexure member the ends of the diaphragm to which the motion sensing means, e.g., the pins and strain wires are connected, will deflect substantially more on application of the same force than in a high energy system, wherein the flexure member has a greater stiffness.

While I have described particular embodiments of my invention for the purpose of illustration, it should be understood that various modifications and adaptations thereof may be made within the spirit of the invention as set forth in the appended claims.

I claim:

1. A motion sensing device, which comprises a frame, a flexible beam, a flexure member connected to said frame and to said beam at spaced points intermediate the ends of said beam and at an angle thereto, to provide bending in said flexure member and said beam between said spaced points, means for applying a force to said beam, said beam extending beyond said flexure member at each end of said beam beyond each of said spaced points, said beam deflecting upon said flexure member between said spaced points of connection of said beam to said flexure member, in a dierction opposite to the direction of deflection of said beam at points beyond said flexure member, and means for sensing the motion of said beam.

2. A motion sensing device which comprises a frame, a flexible diaphragm, a flexure member connected to said frame and to said diaphragm at an angle intermediate the ends thereof, said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a force to said diaphragm, and means for sensing the motion of said diaphragm.

3. A motion sensing device which comprises an integral flexible beam, flexible means for supporting said beam at at least two spaced points located intermediate the ends of said beam, said beam extending beyond said flexure member, means for applying a force to said beam to cause deflection thereof between said points of support in a direction opposite to deflection of the outer ends of said beam beyond said points, and a motion sensing means connected to the outer ends of said beam beyond said flexible support means.

4. A motion sensing device which comprises a flexible diaphragm, a circular flexible supporting means for supporting said diaphragm, said diaphragm extending beyond said flexible supporting means, means for applying a force to said diaphragm to cause deflection of said diaphragm on one side of said support in a direction opposite to deflectoin of the diaphragm on the other side of said support and means for sensing the deflection of said diaphragm and connected to said diaphragm beyond said flexible supporting means.

5. A motion sensing device which comprises a diaphragm, a circumambient flexure member connected to said diaphragm and intersecting said diaphragm, said diaphragm extending beyond said flexure member, said diaphragm bending along lines of flexure on both sides of said flexure member on application of a force against said diaphragm, means for applying a force to said diaphragm, the deflection of said diaphragm on one side of said flexure member being in a direction opposite to the deflection of the diaphragm on the other side of said flexure member, and means for sensing the motion of said diaphragm, said motion sensing means being connected to said diaphragm beyond said flexure member.

6. A pressure responsive device which comprises a housing, said housing having an internal pressure chamber therein, an inlet in said housing to said chamber, a diaphragm supported on said housing at one end of said chamber spaced from said inlet, a circumambient wall of said housing being connected to said diaphragm, said diaphragm extending beyond said wall, said wall being flexible along a circumambient area of flexure on variation in pressure in said chamber against said diaphragm, said diaphragm within said wall deflecting between said wall in a direction opposite to the direction of deflection of the outer end of said diaphragm beyond said wall, and means for sensing the motion of said diaphragm.

7. A motion sensing device, which comprises a frame, an integral flexible beam, a flexure member connected to said frame and to said beam at spaced points intermediate the ends thereof, said flexure member being disposed substantially normal to said beam, means for applying a force to said beam on one side of said flexure member, said beam deflecting upon said flexure member, the mass on one side of said beam from said flexure member being substantially equal to the mass on the other side of said beam from said flexure member, and means for sensing the motion of said beam.

8. A motion sensing device, which comprises a frame, a flexible beam, a flexure member connected to said frame and to said beam at spaced points intermediate the ends of said beam and at an angle thereto, to provide bending in said flexure member and said beam between said spaced points, means for applying a force to said beam, said beam extending beyond said flexure member at each end of said beam beyond each of said spaced points, said beam deflecting upon said flexure member between said spaced points of connection of said beam to said flexure member, in a direction opposite to the direction of deflection of said beam at points beyond said flexure member, and a motion sensing means of the inductive type associated with said beam beyond said flexure member.

9. A motion sensing device, which comprises a frame, an integral flexible beam, a flexure member connected to said frame and to said beam at spaced points intermediate the ends of said beam and at an angle thereto, to provide bending in said flexure member and said beam between said spaced points, means for applying a force to said beam, said beam extending beyond said flexure member at each end of said beam beyond each of said spaced points, said beam deflecting upon said flexure member between said spaced points of connection of said beam to said flexure member, in a direction opposite to the direction of deflection of said beam at points beyond said flexure member, and a motion sensing means including an armature connected to an outer end of said beam beyond said flexure member, and electromagnetic means associated with said armature.

10. A motion sensing device, which comprises a frame, an integral flexible beam, a flexure member connected to said frame and to said beam at spaced points intermediate the ends of said beam and at an angle thereto, to provide bending in said flexure member and said beam between said spaced points, means for applying a force to said beam, said beam extending beyond said flexure member at each end of said beam beyond each of said spaced points, said beam deflecting upon said flexure member between said spaced points of connection of said beam to said flexure member, in a direction opposite to the direction of deflection of said beam at points beyond said flexure member, and a motion sensing means of the inductive type, said means including electromagnetic means spaced from an end of said beam, said end of said beam beyond said flexure member forming an armature cooperating with said electromagnetic means.

11. A motion sensing device which comprises a frame, a flexible diaphragm, a flexure member connected to said frame and to said diaphragm at an angle intermediate the ends thereof, said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a force to said diaphragm, and a motion sensing means including an armature connected to the outer end of said diaphragm beyond said flexure member, and electromagnetic means associated with said armature.

12. A motion sensing device which comprises a frame, a flexible diaphragm, a flexure member connected to said frame and to said diaphragm at an angle intermediate the ends thereof, said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a force to said diaphragm, and a motion sensing means of the inductive type, said means including electromagnetic means spaced from an end of said diaphragm, said end of said diaphragm beyond said flexure member forming an armature cooperating with said electromagnetic means.

13. A motion sensing device which comprises a flexible beam, flexible means for supporting said beam at at least two spaced points located intermediate the ends of said beam, said beam extending beyond said flexure member, means for applying a force to said beam to cause deflection thereof between said points of support in a direction opposite to deflection of the outer ends of said beam beyond said points, and a motion sensing means of the inductive type associated with said beam beyond said flexure member.

14. A motion sensing device which comprises a diaphragm, a circumambient flexure member connected to said diaphragm and intersecting said diaphragm, said diaphragm extending beyond said flexure member, said diaphragm bending along lines of flexure on both sides of said flexure member on application of a force against said diaphragm, means for applying a force to said diaphragm, the deflection of said diaphragm on one side of said flexure member being in a direction opposite to the deflection of the diaphragm on the other side of the said flexure member, and a motion sensing means of the inductive type associated with said diaphragm.

15. A motion sensing device as defined in claim 2, said motion sensing means being of the inductive type and including an armature connected to an outer end of said diaphragm beyond said flexure member, a metal core spaced from said armature and disposed closely adjacent thereto, spaced electrical coils positioned on said core, and an electrical connection at the ends of said coils.

16. A motion sensing device as defined in claim 5, said motion sensing means including a metal core spaced from an outer end of said diaphragm, said core including pole pieces positioned a short distance above and below the outer end of said diaphragm beyond said flexure member, electrical coils positioned on said core, said outer end of said diaphragm forming an armature between said pole pieces, and an electrical connection at the ends of said coils.

17. A pressure responsive device which comprises a frame, a housing mounted in said frame, said housing having an internal pressure chamber therein, an inlet in said frame to said chamber, a diaphragm supported on said housing at one end of said chamber spaced from said inlet, a circumambient wall of said housing being connected to said diaphragm, said diaphragm extending beyond said wall, said wall being flexible along a circumambient area of flexure on variation in pressure in said chamber against said diaphragm, said diaphragm within said wall deflecting betwen said wall in a direction opposite to the direction of deflection of the outer end of said diaphragm beyond said wall, and a motion sensing means of the inductive type associated with said diaphragm beyond said circumambient wall 18. A pressure responsive device as defined in claim 17, said motion sensing means including a metal core spaced from an outer end of said diaphragm, said core including pole pieces positioned a short distance above and below the outer end of said diaphragm beyond said wall, electrical coils positioned on said core, said outer end of said diaphragm forming an armature between said pole pieces, and an electrical connection at the ends of said coils.

19. A pressure responsive device as defined in claim 17, said motion sensing means including an armature connected to the outer end of said diaphragm beyond said wall and disposed substantially normal to the plane of said diaphragm, a metal core spaced from said armature and disposed closely adjacent thereto, a pair of spaced legs on said core positioned directly opposite said armature, an electrical coil disposed about each of said legs on said core, and an electrical connection at the ends of said coils.

20. A motion sensing device, which comprises a frame, a flexible beam, a flexure member connected to said frame and to said beam at spaced points intermediate the ends of said beam and at an angle thereto, to provide bending in said flexure member and said beam between said spaced points, means for applying a force to said beam, said beam extending beyond said flexure member at each end of said beam beyond each of said spaced points, said beam deflecting upon said flexure member between said spaced points of connection of said beam to said flexure member, in a direction opposite to the direction of deflection of said beam at points beyond said flexure member, and motion sensing means of the capacitance type associated with said beam beyond said flexure member.

21. A motion sensing device which comprises a frame, a flexible diaphragm, a flexure member connected to said frame and to said diaphragm at an angle intermediate the ends thereof, said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a force to said diaphragm, and a motion sensing means of the capacitance type associated with the outer end of said diaphragm beyond said flexible member.

22. A motion sensing device as defined in claim 5, said motion sensing means being of the capacitance type and associated with said diaphragm, said last mentioned means comprising a condenser including a plurality of condenser plates, one of said plates being connected to the outer end of said diaphragm beyond said flexure member, said plates being spaced from each other, and an electrical connection to each of said plates.

23. A pressure responsive device which comprises a frame, a housing mounted in said frame, said housing having an internal pressure chamber therein, an inlet in said frame to said chamber, a diaphragm supported on said housing at one end of said chamber spaced from said inlet, a circumambient wall of said housing being connected to said diaphragm, said diaphragm extending beyond said wall, said wall being flexible along a circumambient area of flexure on variation in pressure in said chamber against said diaphragm, said diaphragm within said wall deflecting between said wall in a direction opposite to the direction of deflection of the outer end of said diaphragm beyond said wall, and a motion sensing means of the capacitance type associated with said diaphragm, said means comprising a condenser including a pair of plates, one of said plates being connected to the outer end of said diaphragm beyond said flexure member, the other plate being connected to said frame, said plates being spaced from each other, and an electrical connection to each of said plates.

24. A motion sensing device, which comprises a frame, a flexible beam, a flexure member connected to said frame and to said beam at spaced points intermediate the ends of said beam and at an angle thereto, to provide bending in said flexure member and said beam between said spaced points, means for applying a first force to one side of said beam, means for applying a second force to the opposite side of said beam in opposition to said first force, said beam extending beyond said flexure member at each end of said beam beyond each of said spaced points, said beam deflecting upon said flexure member between said spaced points of connection of said beam to said flexure member, in a direction opposite to the direction of deflection of said beam at points beyond said flexure member, and a means for sensing the motion of said beam, said motion sensing means being connected to said beam beyond said flexure member.

25. A motion sensing device as defined in claim 24, said motion sensing means being of the inductive type.

26. A differential motion sensing device which comprises a frame, a flexible diaphragm, a flexure member connected to said frame and to said diaphragm at an angle intermediate the ends thereof, said diaphragm extending beyond said flexure member, said flexure member having an arcuate cross section and intersecting said diaphragm along spaced arcs intermediate the ends of said diaphragm, said diaphragm bending along lines of flexure radially of said arcs on application of a force against said diaphragm, means for applying a first force to one side of said diaphragm, means for applying a second force to the opposite side of said diaphragm in opposition to said first force, and means for sensing the motion of said diaphragm.

27. A differential motion sensing device as defined in claim 26, said motion sensing means being of the inductive type and associated with the outer end of said diaphragm beyond said flexure member.

28. A differential motion sensing device which comprises a flexible diaphragm, a circular flexible supporting means for said diaphragm, said diaphragm extending beyond said flexible supporting means, means for applying a first force to one side of said diaphragm, means for applying a second force to the opposite side of said diaphragm in opposition to said first force, said diaphragm deflecting at points between said flexible supporting means in response to the resulting differential force, in a direction opposite to the direction of deflection of said diaphragm beyond said flexible supporting means and motion sensing means associated with the outer end of said diaphragm beyond said flexible supporting means.

29. A differential motion sensing device as defined in claim 28, wherein said motion sensing means is of the inductive type.

30. A differential motion sensing device as defined in claim 28, wherein said motion sensing means is of the capacitance type.

31. A differential motion sensing device as defined in claim 29, said motion sensing means including an armature connected to an outer end of said diaphragm beyond said flexure supporting means, and electromagnetic means associated with said armature.

32. A differential pressure responsive device which comprises a housing, said housing having a pair of internal pressure chambers therein, an inlet in said housing to each of said chambers, a diaphragm supported on said housing and separating said chambers, the adjacent circumambient walls of said chambers being connected to said diaphragm, said diaphragm extending beyond said walls, said walls each being flexible along a circumambient area of flexure on variation of pressure in said chambers against said diaphragm, said diaphragm within said walls deflecting between said walls in response to the differential pressures in said chambers in a direction opposite to the direction of deflection of the outer end of said diaphragm beyond said walls, and means for sensing the motion of said diaphragm.

33. A differential pressure responsive device as defined in claim 32, said motion sensing means being of the inductive type and associated with the outer periphery of said diaphragm beyond said walls.

34. A differential pressure responsive device as defined in claim 33, said motion sensing means including an armature connected to the outer periphery of said diaphragm beyond said walls, and electromagnetic means associated with said armature.

References Cited in the file of this patent

UNITED STATES PATENTS

| | | |
|---|---|---|
| 2,369,650 | Allen | Feb. 20, 1945 |
| 2,715,680 | Tatel | Aug. 16, 1955 |
| 2,721,919 | Li | Oct. 25, 1955 |
| 2,759,157 | Wiancko | Aug. 14, 1956 |